US008963010B2

(12) United States Patent
Sprenger et al.

(10) Patent No.: US 8,963,010 B2
(45) Date of Patent: Feb. 24, 2015

(54) FRAME FOR A CABLE PENETRATION SYSTEM, AND BUSH THEREFOR

(75) Inventors: Dennis Sprenger, Horn-Bad Meinberg (DE); Thorsten Diessel, Hiddenhausen (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 96 days.

(21) Appl. No.: 13/821,819

(22) PCT Filed: Sep. 9, 2011

(86) PCT No.: PCT/EP2011/065651
§ 371 (c)(1),
(2), (4) Date: Jul. 22, 2013

(87) PCT Pub. No.: WO2012/032157
PCT Pub. Date: Mar. 15, 2012

(65) Prior Publication Data
US 2013/0292157 A1 Nov. 7, 2013

(30) Foreign Application Priority Data
Sep. 10, 2010 (DE) .......................... 10 2010 037 463

(51) Int. Cl.
*H02G 3/22* (2006.01)
*H02G 3/08* (2006.01)
*H02G 15/007* (2006.01)

(52) U.S. Cl.
CPC ................. *H02G 3/22* (2013.01); *H02G 3/083* (2013.01); *H02G 15/007* (2013.01)
USPC .... 174/151; 174/650; 174/152 G; 174/153 G; 248/68.1; 248/49

(58) Field of Classification Search
CPC ............. H02G 3/22; H02G 3/24; H02G 3/26; H02G 3/30; H02G 3/36; H02G 15/007; H02G 15/04; H02G 3/083; B60R 16/0222; B60R 16/0215
USPC ...... 174/151, 650, 135, 152 G, 153 G, 152 R, 174/659, 664, 137, 155, 156; 248/74.1, 248/74.2, 74.3, 68.1, 65, 49, 56; 16/2.1, 2.2
See application file for complete search history.

(56) References Cited

U.S. PATENT DOCUMENTS
3,489,440 A * 1/1970 Brattberg ........................ 248/56
4,291,195 A * 9/1981 Blomqvist et al. .............. 248/56
(Continued)

FOREIGN PATENT DOCUMENTS
DE 3715945 1/1988
DE 19721659 11/1998
(Continued)

OTHER PUBLICATIONS
English Language Abstract of DE 102007012190 published on Sep. 18, 2008.
(Continued)

*Primary Examiner* — Angel R Estrada
(74) *Attorney, Agent, or Firm* — DLA Piper LLP (US)

(57) ABSTRACT

The invention relates to a frame (1, 1*a*, 1*b*) for a cable penetration system. Said frame, which is used for receiving a plurality of bushes (20, 120, 220), comprises at least one strip (2, 12) that is arranged at a distance from the frame and is lower than the adjacent frame. Connection devices (3, 3', 3") suitable for receiving suitable mating pieces (23, 123, 223) for the connection devices are disposed on the strip (2, 12), the mating pieces being disposed on bushes (20, 120, 220). The connection devices (3, 3', 3") are arranged in such a way that bushes can be mounted in the frame essentially only in the direction normal to the frame. The invention further relates to a bush (20, 120, 220) for a cable penetration system. Said bush, which is to be received in a frame, comprises a main body, inside which a through-hole (21, 121, 221) is provided from a top side to a bottom side in the normal direction in order to receive a cable. The bush comprises at least one strip (22, 122, 132, 222, 232, 322) which is arranged at a distance from the main body and is lower than the adjacent main body. Connection devices (23, 123, 223) suitable for receiving suitable mating pieces (3, 3', 3") for the connection pieces are disposed on the strip, the mating pieces being disposes on a frame. The connection devices (23, 123, 223) are arranged in such a way that the bush can be mounted in the frame essentially only in the direction normal to the frame, at least two connection devices (3, 3', 3") being arranged on the strip (2, 12) for each bush that is to be mounted.

24 Claims, 7 Drawing Sheets

(56) References Cited

U.S. PATENT DOCUMENTS

| | | | |
|---|---|---|---|
| 4,702,444 A * | 10/1987 | Beele | 248/56 |
| 4,919,372 A * | 4/1990 | Twist et al. | 248/56 |
| 5,108,060 A * | 4/1992 | Beele | 248/56 |
| 6,521,840 B1 * | 2/2003 | Kreutz | 174/151 |
| 7,005,579 B2 * | 2/2006 | Beele | 174/153 G |
| 7,288,730 B2 * | 10/2007 | Habel et al. | 174/650 |
| 7,806,374 B1 | 10/2010 | Ehmann | |
| 8,093,513 B2 * | 1/2012 | Elm et al. | 174/650 |
| 8,616,506 B2 * | 12/2013 | Milton | 248/68.1 |
| 2010/0326724 A1 | 12/2010 | Karlsson | |

FOREIGN PATENT DOCUMENTS

| | | |
|---|---|---|
| DE | 29924314 | 11/2002 |
| DE | 102004048055 | 4/2006 |
| DE | 102005017689 | 10/2006 |
| DE | 10 2005 002 879 | 11/2006 |
| DE | 102005056215 | 5/2007 |
| DE | 10 2007 012 189 | 9/2008 |
| DE | 102007012190 | 9/2008 |
| DE | 10 2007 060 100 | 6/2009 |
| WO | WO 01/42046 | 6/2001 |
| WO | WO 2009/102262 | 8/2009 |

OTHER PUBLICATIONS

English Language Abstract of DE 102004048055 published Apr. 6, 2006.
English Language Abstract of DE 102005017689 published on Oct. 12, 2006.
English Language Abstract of DE 3715945 published Jan. 21, 1988.
International Search Report issued in PCT/EP2011/065651 on Mar. 11, 2013.
International Preliminary Report on Patentability issued in PCT/EP2011/065651 on May 8, 2013.
Japanese Office Action issued for 2013527620 on Jun. 3, 2014, 3 pgs.

* cited by examiner

FRAME FOR A CABLE PENETRATION SYSTEM, AND BUSH THEREFOR

The invention relates to a frame of a cable entry system and to corresponding grommets.

Grommets and frames are known from the prior art. However, these are prone to errors in handling and installation-unfriendly.

One example of this is the grommets known from EP 1 236 256. There, without exception, all grommets must be mounted before installation of the frame. Another shortcoming is that the ribs prevent the flexible assignment of grommets of differing diameters. Another drawback is that the frame makes maintenance work more difficult because even replacing a single grommet requires disassembly of the frame.

These drawbacks are also known, either individually or in combination, from other grommets and frame systems from the prior art.

Thus, it is the object of the invention to provide a frame of a cable entry system and a grommet therefor, which solve one or more shortcomings known from the prior art in an inventive manner.

The object is achieved by a frame of a cable entry system, wherein the frame is provided to receive a plurality of grommets. The frame comprises at least one strip that is stepped with respect to the frame and has a lower height than the neighboring frame. Connecting devices are provided on the strip, which are suited to receive suitable connecting device mating pieces arranged on grommets. To this end, the connecting devices are provided so that they essentially allow grommets to be installed in the frame only in a direction that is normal relative to the frame, wherein at least two connecting devices are provided on the strip for each grommet to be installed.

In a further embodiment of the invention, the distance from the first connecting device to a second neighboring connecting device, which is arranged directly next to the first connecting device on the strip, does not correspond to the distance between the second connecting device and a third connecting device, which is arranged directly next to the second connecting device on the strip.

According to a further embodiment of the invention, the frame comprises two strips that are stepped with respect to the frame, wherein the strips are arranged on opposite sides of the frame.

According to still another embodiment of the invention, the connecting devices are protuberances.

In a further embodiment of the invention, the connecting device has a cylindrical or truncated cone shape.

In still another embodiment of the invention, the frame can be composed of multiple sub-segments that are plugged together.

According to a further embodiment of the invention, the frame is produced from a plastic material or metal.

According to still another embodiment of the invention, the frame comprises fastening devices for installation on a housing.

According to a further embodiment of the invention, the frame comprises one or more seats for accommodating corresponding protuberances that are arranged on grommets.

According to still another embodiment of the invention, the frame comprises one or more openings, which are suited to receive a stabilizing element and correspond to cut-outs on the edge of grommets to be received.

The object is also achieved by a grommet of a cable entry system to be received in a frame, wherein the grommet comprises a main body, wherein the main body is provided with a through-hole from the upper face to the lower face in a normal direction so as receive a cable, wherein the grommet comprises at least one strip that is stepped laterally with respect to the main body and has a lower height than the neighboring main body, wherein connecting devices are provided on the strip, which are suited to receive suitable connecting device mating pieces arranged on a frame, wherein the connecting devices are arranged so that these essentially allow the grommet to be installed in the frame only in a direction that is normal relative to the frame, wherein at least two connecting devices are provided on the strip.

In still another embodiment of the invention, the side of the main body that is located opposite the strip comprises a support device, which can be engaged in an identical grommet arranged laterally reversed thereto.

According to a further embodiment of the invention, the grommet comprises two strips that are stepped with respect to the main body, wherein the strips are arranged on opposite sides of the main body. According to still another embodiment of the invention, the connecting devices are cut-outs.

In a further embodiment of the invention, the connecting devices are cylindrical or truncated cone-shaped cut-outs.

In still another embodiment of the invention, the grommet comprises a slot such that simpler access to the through-hole in the main body is made possible.

According to a further embodiment of the invention, the slot comprises a step.

According to still another embodiment of the invention, the slot is not continuous to the through-hole and/or not continuous from the upper face to the lower face.

In a further embodiment of the invention, a sealing lip is provided on a lateral edge, which directly adjoins the side comprising the strip.

In a further embodiment of the invention, the grommet comprises additional cut-outs in the normal direction.

According to a further embodiment of the invention, the grommet is produced from elastic plastic material.

According to still another embodiment of the invention, the grommet comprises a protuberance on the strip, wherein the protuberance is further suited to be accommodated in a corresponding seat, which is provided on the frame.

In still another embodiment of the invention, the grommet comprises one or more cut-outs on the edge so as to receive a stabilizing element. The invention will be described in more detail hereafter based on the drawings.

Figure 1:
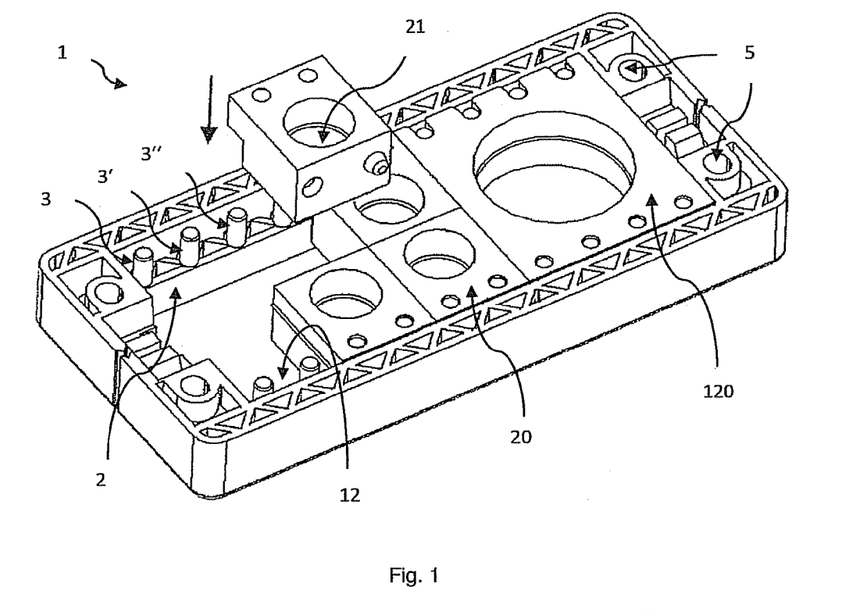
FIG. 1 shows a frame according to one embodiment of the invention and grommets according to various embodiments of the invention.

In the drawings:

FIG. 1 shows a frame 1 of a cable entry system according to one embodiment of the invention and grommets 20, 120 according to various embodiments of the invention.

The frame 1 comprises a strip 2 that is stepped with respect to the frame and has a lower height than the neighboring frame 1. The frame can also comprise additional stepped strips, for example a strip 12, which has a similar design.

Connecting devices 3, 3', 3" are arranged on the strip 2, which are suited to receive suitable connecting device mating pieces 23, 123, 223.

Such connecting device mating pieces are provided on the grommets 20, 120, for example.

To this end, the connecting devices 3, 3', 3" are arranged so that these essentially allow grommets to be installed in the frame only in a direction that is normal relative to the frame. The direction is indicated by the arrow.

The arrangement of the connecting devices assures that grommets are easy to insert. Moreover, the frame can easily receive differing grommets, so that no special frame is required any longer for differing grommets. In addition, if a single grommet is to be removed, it is no longer necessary to disassemble the entire frame, but the grommet can be removed from the frame, for example if a clamped connection or braced connection that was created is released. The flexibility and the assembly friendliness are thus considerably increased.

Moreover, the configuration also allows the grommets 20, 120, 220 to be retained securely on the frame. This can be achieved by a suitable configuration of the connecting devices, so that, for example, slight pressing is required for insertion. It is also possible for a cable that is inserted in a grommet to cause a deformation so that a clamped connection of the connecting devices and the connecting device mating pieces is caused.

According to a first embodiment of a cable entry system to be received in a frame 1, the grommet 20 comprises a main body. A through-hole 21 is provided in this main body from an upper face to a lower face in the normal direction so as to receive a cable. Such a grommet is also shown in detail in FIG. 3.

Figure 3:
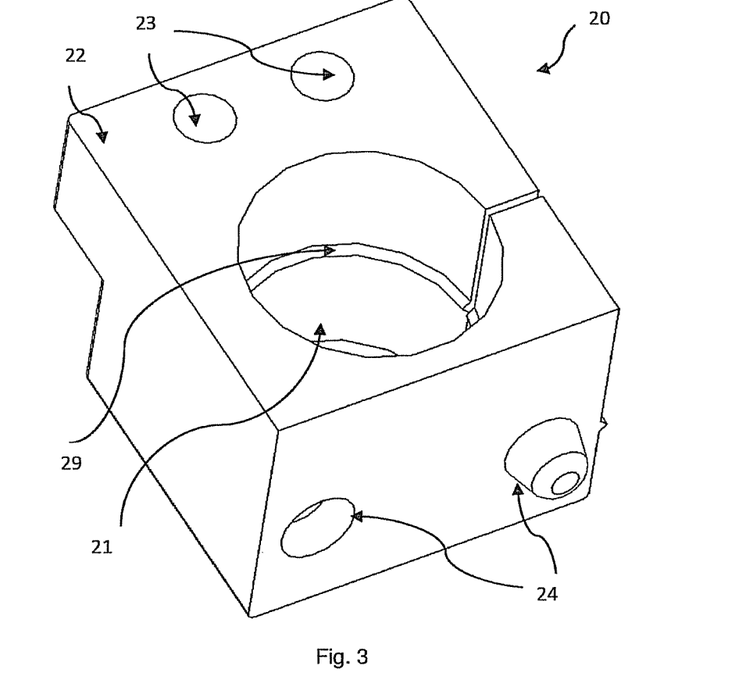
FIG. 3 shows a grommet according to a first embodiment of the invention.

The grommet 20 further comprises a strip 22 that is stepped with respect to the main body and has a lower height than the neighboring main body.

Connecting devices 23 are arranged on the strip, which are suited to receive suitable connecting device mating pieces 3, 3', 3".

Such connecting device mating pieces are provided on the frame, for example.

To this end, the connecting devices 23 are arranged so that these essentially allow the grommet to be installed in the frame only in a direction that is normal relative to the frame. This direction is indicated by the arrow.

Moreover, it is also possible for a grommet 120 according to a second embodiment to be received in the frame 1. This grommet 120 essentially differs from the grommet 20 by being suited to receive thicker cables. Such a grommet is also shown in detail in FIG. 4.

Figure 4:
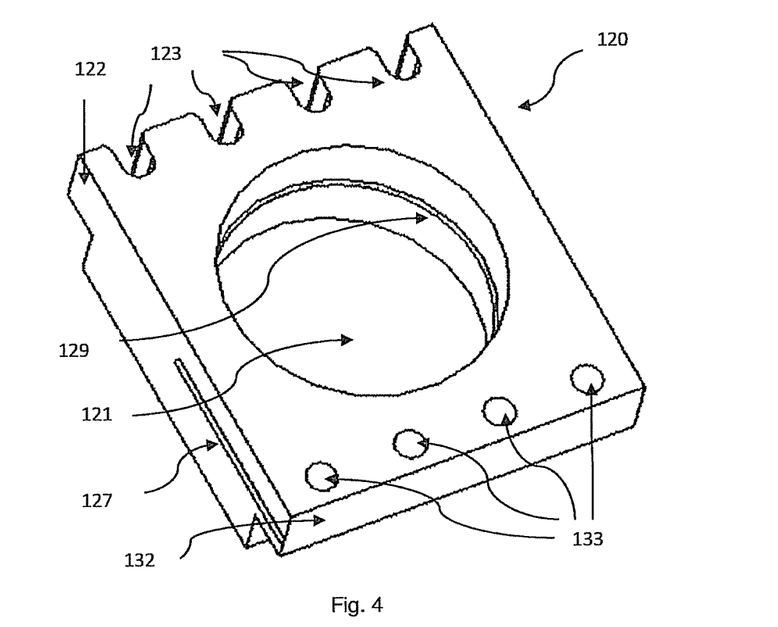
FIG. 4 shows a grommet according to a second embodiment of the invention.

The grommet 120 of a cable entry system to be received in a frame 1 comprises a main body. A through-hole 121 is provided in this main body from an upper face to a lower face in the normal direction so as to receive a cable.

The grommet 120 further comprises a strip 122, 132 that is stepped with respect to the main body and has a lower height than the neighboring main body.

Connecting devices 123, 223 are provided on the strip, which are suited to receive suitable connecting device mating pieces 3, 3', 3".

Such connecting device mating pieces are arranged on the frame, for example.

To this end, the connecting devices 123, 223 are arranged so that these essentially allow the grommet to be installed in the frame only in a direction that is normal relative to the frame.

Figure 2:
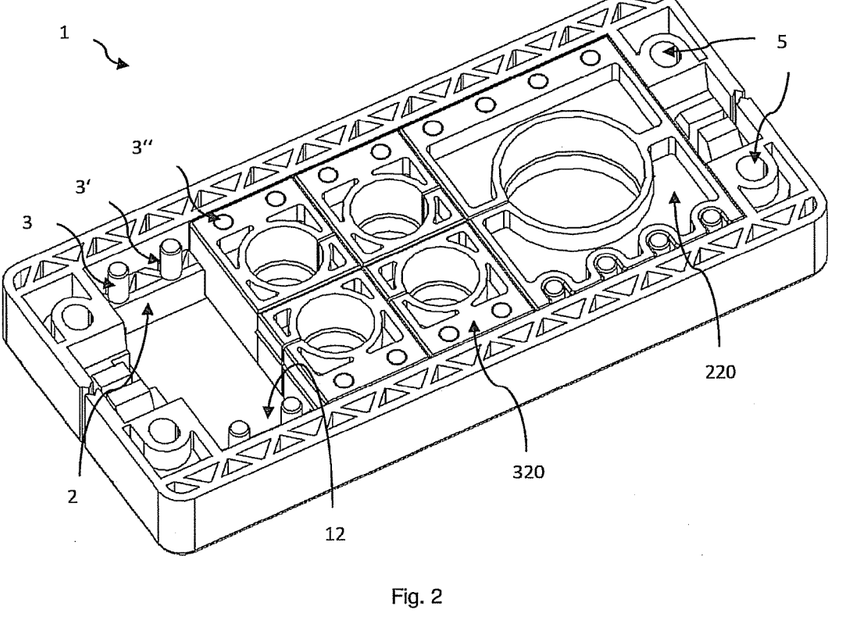
FIG. 2 shows a frame according to one embodiment of the invention and grommets according to various embodiments of the invention.

FIG. 2 shows a frame 1 according to one embodiment of the invention and grommets 220, 320 according to various embodiments of the invention.

Figure 5:
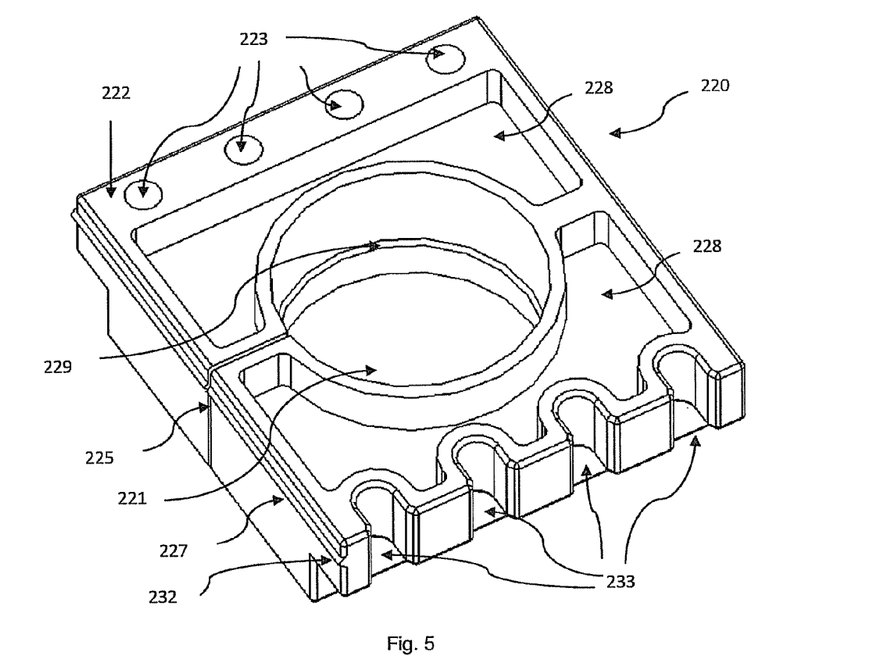
FIG. 5 shows a grommet according to a third embodiment of the invention.

A grommet 220 according to a third embodiment is also shown in detail in FIG. 5. A grommet 320 according to a fourth embodiment is also shown in detail in FIG. 7.

Figure 7:
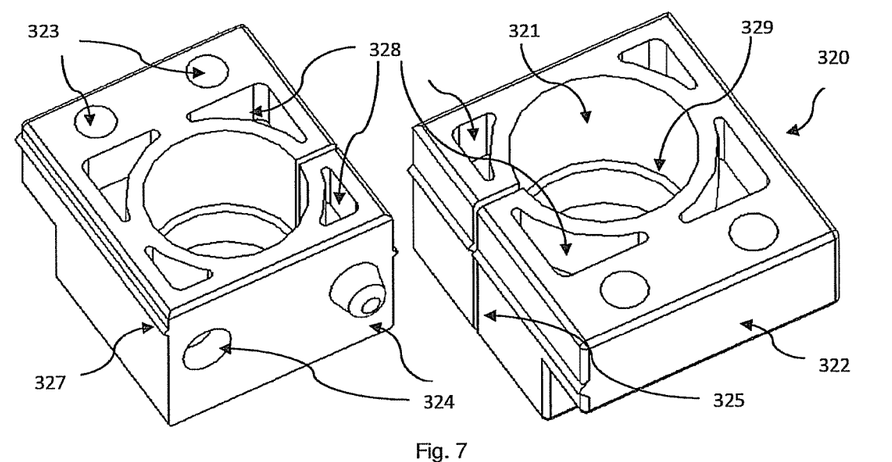
FIG. 7 shows two views of a grommet according to a fifth embodiment of the invention.

The grommet 320 comprises a strip 322 that is stepped with respect to the main body and has a lower height than the neighboring main body.

Contrary to the grommets 20, 120, these grommets 220, 320 comprise cut-outs 228, 328. These cut-outs allow material to be saved. The cut-outs 228 also allow the force to act on a smaller area and the lower region to be designed with more flexibility, which results in optimized sealing of the cable.

Figure 6:
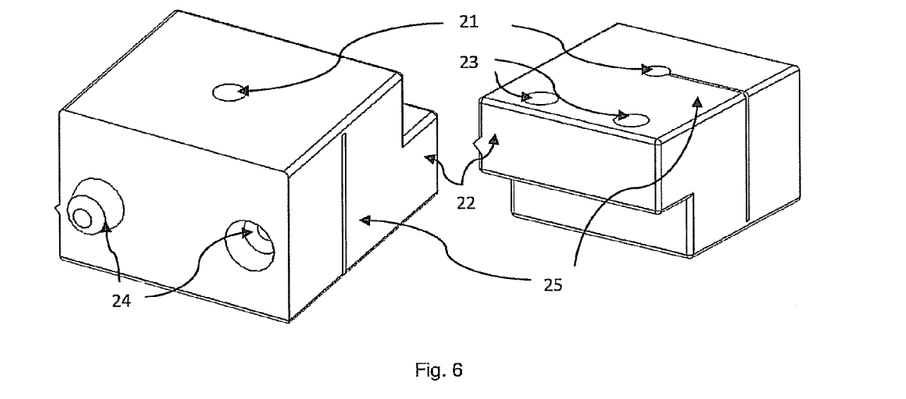
FIG. 6 shows two views of a grommet according to a fourth embodiment of the invention.
Figure 8:
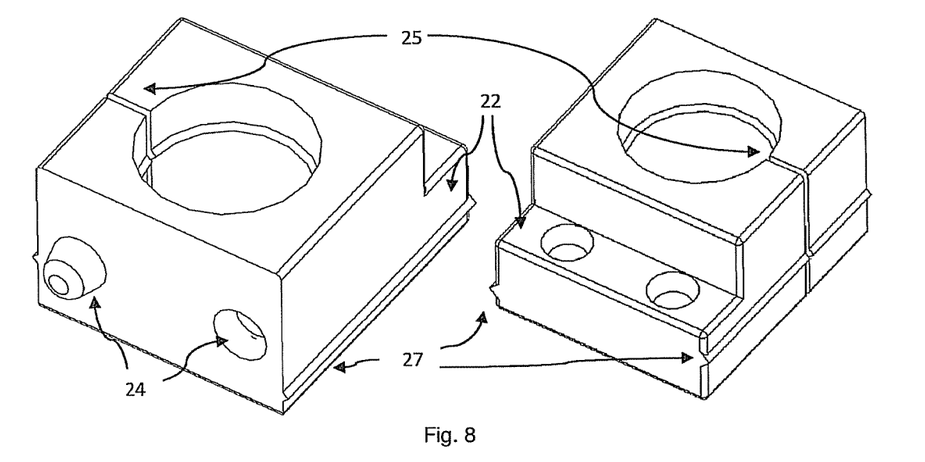
FIG. 8 shows two views of a grommet according to a sixth embodiment of the invention.
Figure 9:
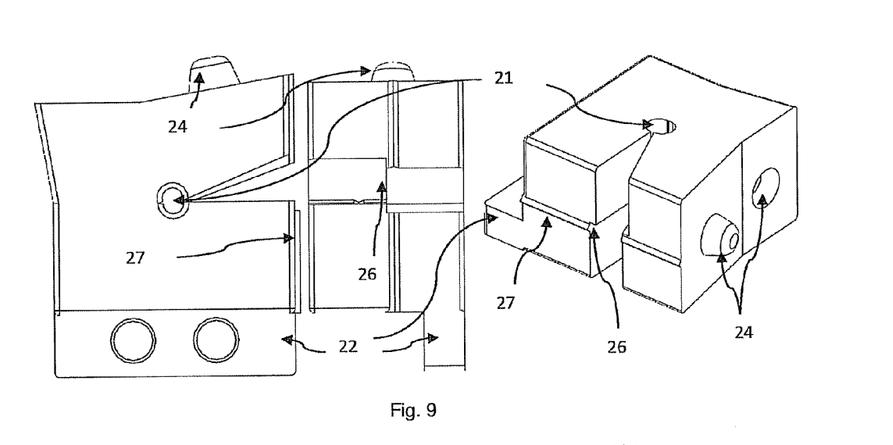
FIG. 9 shows three views of a grommet according to a seventh embodiment of the invention.

The grommet 220 shown in FIG. 5 comprises a slot 225, the grommet 20 shown in FIGS. 6, 8 and 9 comprises a slot 25, and the grommet 320 shown in FIG. 7 comprises a slot 325. The slot is such that easier access is made possible to the through-hole 21, 121, 221 in the main body. Such an arrangement facilitates the insertion of a cable. The slot can, of course, be arranged on any other side, in particular also on a strip side or on the side located opposite a strip. However, as is shown in FIGS. 6 to 9, the slot is arranged laterally, so that better sealing can be achieved in the installed state.

A cable can be inserted in the grommet through the slot 25, 225, 325.

This slot can be continuous or closed on the upper face, for example approximately 1 mm.

The slot does not need to be continuous from the upper face to the lower face, but can also be designed only in sub-regions, as is shown by way of example in FIG. 6.

If the slot 25 is not designed to be continuous, it is only torn open by insertion of a cable. The slot 25 is implemented without the production-related loss of material in this variant, which results in optimized sealing.

Moreover, as shown in an expanded illustration in FIG. 9, the slot can have a step 26. This geometry suppresses the development of a manufacturing-related gap on the installed grommet 20.

Such a step 26 does not necessarily have to be a step having a right angle, but can also be a pointed step, so that a kind of channel forms on the two sides. Steps 26 allow improved sealing of the slot 25. This may even be necessary under some circumstances so as to attain approval for equipment in atmospheres prone to explosions or for applications in moist environments.

Moreover, the different embodiments of the grommets can also be provided with an inner sealing lip 29, 129, 229, 329, which allows improved sealing of an inserted cable. This may even be necessary under some circumstances so as to attain approval for equipment in atmospheres prone to explosions or for applications in moist environments.

The peripheral sealing lip 29, 129, 229, 329 on the inside is pressed into the insulation of the cable as a result of compression of the elements, whereby the cable is both sealed and relieved of strain.

Moreover, the grommets can comprise a sealing lip 27, 127, 227, 327 on one or more lateral edges. For example, a sealing lip is provided at least in some regions of a lateral edge on the grommets in FIGS. 3 to 9, which directly adjoins a side comprising the strip 22, 122, 132, 333, 232, 322.

The sealing lip 27, 127, 227, 327 laterally seals the sealing elements with respect to each other. These sealing lips 27, 127, 227, 327 can be arranged both on one side, and offset in terms of height on both sides, of the sealing element.

In a particularly preferred manner, at least two connecting devices 3, 3', 3" are arranged on the strip 2 and/or 12 of the frame 1 for each grommet 20, 120, 220, 320 to be installed.

In FIG. 1, for example, two connecting devices are arranged on the strip 2 of each grommet 20. Four connecting devices are arranged on the strip 2 for each grommet 120.

FIG. 2 again shows two connecting devices arranged on the strip 2 for each grommet 320. Four connecting devices are arranged on the strip 2 for each grommet 220.

Without being limited to the numbers described above, it is also possible to provide 3, 5 or more connecting devices, depending on the size of the grommet.

It is particularly advantageous if the distance from a first connecting device 3 to a second neighboring connecting device 3', which is arranged directly adjacent to the first connecting device 3 on the strip 2, does not correspond to the distance between the second connecting device 3' and a third connecting device 3", which is arranged directly adjacent to the second connecting device 3' on the strip 2.

In this case, simple mechanical or even optical coding may be provided, so that faulty installation is prevented.

Moreover, the frame 1 can be designed to comprise two strips 2, 12 that are stepped with respect to the frame 1, wherein the strips are arranged on opposite sides of the frame.

Similarly, the grommet 120, 220 may also comprise two strips 122, 132, 222, 232 that are stepped with respect to the main body, wherein the strips 122, 132, 222, 232 are arranged on opposite sides of the main body, see FIGS. 4 and 5.

The connecting devices 3, 3', 3" on the frame can be designed as protuberances, for example. These correspond to connecting device mating pieces 23, 123, 133, 223, 233, 323 on the grommets.

These protuberances 3, 3', 3" can take on any suitable shape. However, it is particularly preferred if the connecting devices 3, 3', 3" have a cylindrical or truncated cone shape.

Similarly, the connecting device mating pieces 23, 123, 133, 223, 233, 323 on the grommets can have any suitable shape. However, it is particularly preferred—with respect to the cable grommet connecting device—for the connecting device mating pieces 23, 123, 133, 223, 233, 323 to be cut-outs.

The connecting devices 3, 3', 3" of the frame 1 particularly preferably have a cylindrical or truncated cone shape.

In a similarly particularly preferred manner, the connecting device mating pieces 23, 123, 133, 223, 233, 323 on the grommets 23, 123, 133, 223, 233, 323 are designed as cylindrical or truncated cone-shaped 23, 123, 223, 323 or cylinder segment- or truncated cone segment-shaped 133, 233 cut-outs.

Figure 11:
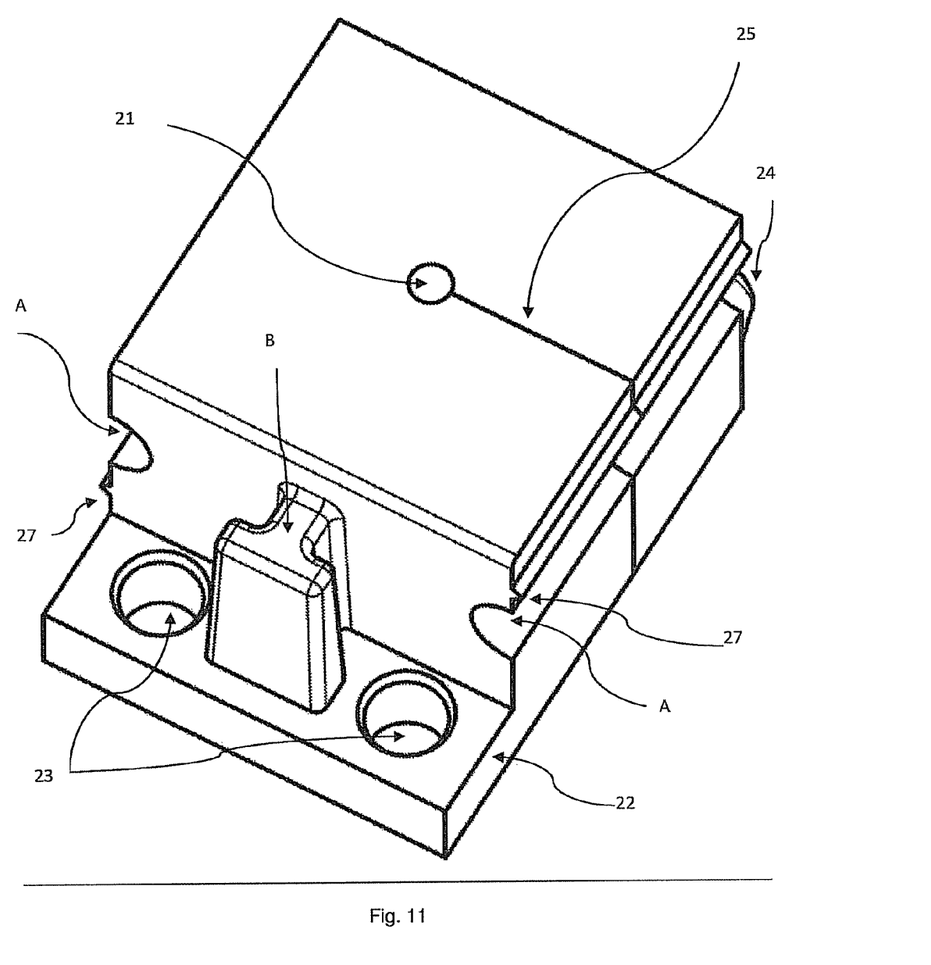
FIG. 11 shows a grommet according to an eighth embodiment of the invention.

Moreover, the grommets according to all embodiments may comprise protuberances B, in addition or as an alternative to the connecting device mating pieces 23, 123, 133, 223, 233, 323 on the grommets 23, 123, 133, 223, 233, 323. Such a protuberance B is shown in FIG. 11 by way of example.

Figure 12:
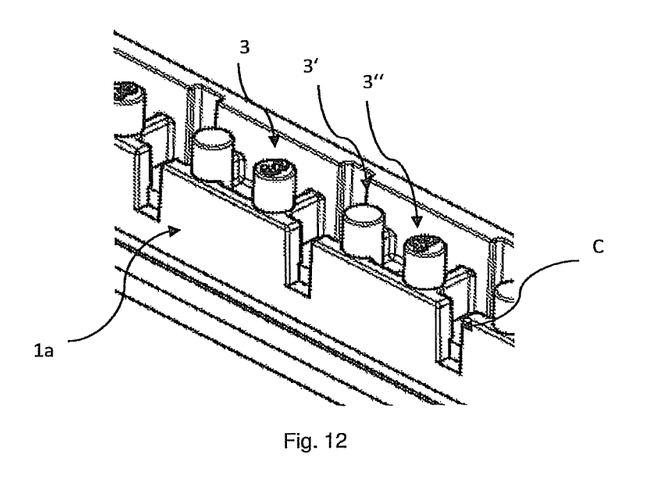
FIG. 12 shows a detail of a frame according to various embodiments of the invention.

Such a protuberance B is particularly advantageous if the strip 22, 122, 132, 222, 232, 322 that is stepped with respect to the main body is rather thin compared to the main body. The protuberance B has a T-shaped design by way of example and offers stabilization in a plane perpendicular to the cable direction (normal direction). To this end, the protuberance B may thicken toward the stepped strip, so that the insertion into suitable seats C on a frame 1a—as shown in FIG. 12—is particularly easy to do and additionally prealignment is provided in the seat C. Moreover, the grommets according to all embodiments can additionally or alternatively be equipped with one or more cut-outs A on the edge. Stabilizing elements can be received in these cut-outs A after the frame 1 and the grommets have been installed, wherein these stabilizing elements lend additional stability to the frame 1 and/or the grommets in the frame 1 in the cable direction (normal direction). The frame 1 or the frame parts 1a, 1b thereof then also comprise corresponding openings for this purpose, so that the stabilizing elements can be easily inserted. The stabilizing elements are designed as pins or screws, for example. Moreover, the grommets 20, 320 may also comprise support devices 24, 324.

These support devices 24, 324 are designed to be arranged on the main body on the side that is located opposite the strip.

These support devices 24, 324 can be engaged in identical support devices 24, 324 of other grommets that is arranged laterally reversed thereto, as is apparent from FIGS. 1 and 2.

By placing support devices 24, 324 on one side of the grommets 20, 320, the grommets 20, 320 can be supported with respect to each other. This stabilization not only makes it more difficult for the grommets 20, 320 to fold inward, but the support devices 24, 324 also cause the grommets 20, 320 to locate each other when the two halves are installed, whereby installation is facilitated.

Figure 10:
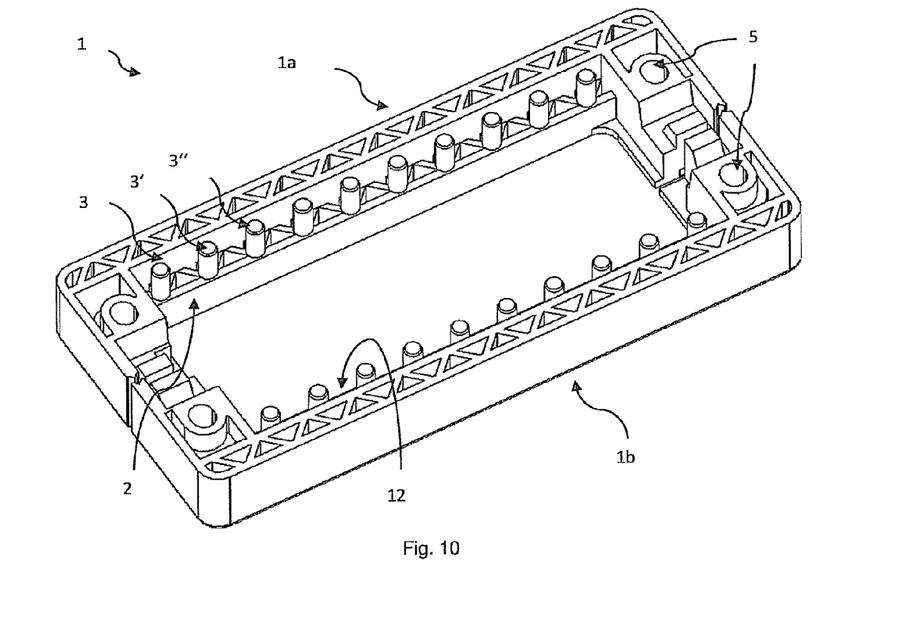
FIG. 10 shows a frame according to one embodiment of the invention.

As is shown in FIGS. 1, 2 and 10, the frame 1 can also comprise fastening devices 5 for installation on a housing. These fastening devices 5 can be designed as boreholes, for example, so that the frame can be screwed to a housing.

According to the invention, the frame 1—as illustrated in FIG. 10—may also be composed of multiple sub-segments 1a, 1b, which can be plugged together, for example.

This provides flexibility to insert intermediate pieces, so that it is also possible to use a larger number of grommets or to use larger grommets.

The connecting devices 3, 3', 3" then assure that the grommets 20, 120, 220, 320—even with a multi-piece design of the frame 1a, 1b—are captively held in one of the sub-segments 1a, 1b.

The grommets according to the various embodiments can, for example, be used mixed among each other.

The grommets according to the invention are particularly easy to produce from an elastic plastic material. The frame 1 or the frame segments 1a, 1b thereof can likewise be produced from plastic material or metal.

In summary, it can be noted that the invention allows frames and grommets to be provided, which, without the use of intermediate webs, assure that variably sized grommets 20, 120, 220, 320 can be mounted in one and the same variant of a frame 1. The offset between the connecting devices 3, 3', 3" can serve as a mechanical or optical coding and thereby prevent faulty installation.

By installing the grommets 20, 120, 220, 320 in the direction of the cable, which is to say in a direction that is normal relative to the frame, convenient assembly and disassembly are assured.

It is also possible to provide an optical and/or haptic marking on the frame 1 or on the frame segments 1a, 1b, as shown in FIG. 12 on the connecting devices 3, 3", whereby precise and unambiguous association is possible. This considerably simplifies the construction and documentation as well as later replacement of cables, because with suitable documentation a cable or the associated grommet can be found in a targeted manner.

LIST OF REFERENCE NUMERALS frame 1
frame sub-segment 1a, 1b
strip 2, 12
connecting device 3, 3', 3"
fastening devices 5
grommet 20, 120, 220, 320
hole 21, 121, 221, 321
strip 22, 122, 132, 222, 232, 322
connecting device mating pieces 23, 123, 133, 223, 233, 323
support device 24, 324
slot 25, 225, 325
step 26
sealing lip 27, 127, 227, 327
cut-outs 228, 328
sealing lip 29, 129, 229, 329
cut-out A
protuberance B
seat C

The invention claimed is:

1. A frame of a cable entry system, wherein
the frame is provided to receive a plurality of grommets,
wherein the frame comprises at least one strip that is stepped with respect to the frame and has a lower height than a neighboring frame,
wherein connecting devices are arranged on the strip, the connecting devices configured to receive suitable connecting device mating pieces that are provided on grommets,
wherein the connecting devices are arranged such that the connecting devices allow the grommets to be installed in the frame only in a direction that is normal relative to the frame, and
wherein at least two of the connecting devices are arranged on the strip for each grommet to be installed.

2. The frame according to claim 1, wherein a first distance from a first connecting device to a second neighboring connecting device, which is arranged directly adjacent to the first connecting device on the strip, does not correspond to a second distance between the second connecting device and a third connecting device, which is arranged directly adjacent to the second connecting device on the strip.

3. The frame according to claim 1, wherein the frame comprises two strips that are stepped with respect to the frame, wherein the strips are arranged on opposite sides of the frame.

4. The frame according to claim 1, wherein the connecting devices are protuberances.

5. The frame according to claim 1, wherein the connecting devices have a cylindrical or truncated cone shape.

6. The frame according to claim 1, wherein the frame can be plugged together from multiple sub-segments.

7. The frame according to claim 1, wherein the frame is produced from a plastic material or metal.

8. The frame according to claim 1, wherein the frame comprises fastening devices for installation on a housing.

9. The frame according to claim 1, wherein the frame comprises one or more seats for accommodating corresponding protuberances, which are arranged on grommets.

10. The frame according to claim 1, wherein the frame comprises one or more holes, which are suited to receive a stabilizing element and correspond to cut-outs at the edge of grommets to be received.

11. A grommet of a cable entry system to be received in a frame, the grommet comprising:
a main body, wherein a through-hole is provided in the main body from an upper face to a lower face in the normal direction so as to receive a cable,
at least one strip that is stepped laterally with respect to the main body and has a lower height than a neighboring main body,
wherein connecting devices are provided on the strip, the connecting devices configured to receive suitable connecting device mating pieces that are arranged on the frame,
wherein the connecting devices are arranged such that the connecting devices allow the grommets to be installed in the frame only in a direction that is normal relative to the frame.

12. The grommet according to claim 11, wherein at least two connecting devices are arranged on the strip.

13. The grommet according to claim 11, wherein the side of the main body that is located opposite the strip comprises a support device, which can be engaged in an identical grommet arranged laterally reversed thereto.

14. The grommet according to claim 11, wherein the grommet comprises two strips that are stepped with respect to the main body, wherein the strips are arranged on opposite sides of the main body.

15. The grommet according to claim 11, wherein the connecting devices are cut-outs.

16. The grommet according to claim 15, wherein the connecting devices are cylindrical or truncated cone-shaped or cylinder segment- or truncated cone segment-shaped cut-outs.

17. The grommet according to claim 11, wherein the grommet comprises a slot such that easier access is made possible to the through-hole in the main body.

18. The grommet according to claim 17, wherein the slot comprises a step.

19. The grommet according to claim 17, wherein the slot is not continuous to the through-hole and/or not continuous from the upper face to the lower face.

20. The grommet according to claim 11, wherein a sealing lip is provided at least in some regions of a lateral edge, which directly adjoins a side comprising the strip.

21. The grommet according to claim 11, wherein the grommet comprises additional cut-outs in the normal direction.

22. The grommet according to claim 11, wherein the grommet is produced from an elastic plastic material.

23. The grommet according to claim 11, wherein the grommet comprises a protuberance on the strip, the protuberance being suited to be accommodated in a corresponding seat, which is provided on the frame.

24. The grommet according to claim 11, wherein the grommet comprises one or more cut-outs at the edge to receive a stabilizing element.

* * * * *